(12) United States Patent
Uetani et al.

(10) Patent No.: US 7,097,940 B2
(45) Date of Patent: Aug. 29, 2006

(54) GEL ELECTROLYTE, PROCESS FOR PRODUCING THE SAME, AND USE THEREOF

(75) Inventors: Yoshihiro Uetani, Ibaraki (JP); Shuuhei Murata, Ibaraki (JP); Keisuke Kii, Ibaraki (JP)

(73) Assignee: Nitto Denko Corporation, Tokyo (JP)

( * ) Notice: Subject to any disclaimer, the term of this patent is extended or adjusted under 35 U.S.C. 154(b) by 500 days.

(21) Appl. No.: 10/383,071

(22) Filed: Mar. 7, 2003

(65) Prior Publication Data

US 2003/0207179 A1    Nov. 6, 2003

(30) Foreign Application Priority Data

Mar. 26, 2002 (JP) .......................... P. 2002-086440

(51) Int. Cl.
*H01M 6/14* (2006.01)
(52) U.S. Cl. .................. 429/303; 429/300; 429/309
(58) Field of Classification Search ................ 429/300, 429/303, 309
See application file for complete search history.

(56) References Cited

FOREIGN PATENT DOCUMENTS

| JP | 8-509100 | 9/1996 |
|---|---|---|
| JP | 8-298126 | 11/1996 |
| JP | 9-500485 | 1/1997 |
| JP | 11-176452 | 7/1999 |
| JP | 2000-30528 A | 1/2000 |

OTHER PUBLICATIONS

Maaike De Loos, et al./ Remarkable Stabilization of Self-Assembled Organogels by Polymerzation./ J. Am. Chem. Soc. 1997, 119, 12675-12676.
European Search Report dated Mar. 29, 2005.

*Primary Examiner*—Laura Weiner
(74) *Attorney, Agent, or Firm*—Sughrue Mion, PLLC

(57) ABSTRACT

A uniform gel electrolyte having high durability and use thereof, in particular, batteries or capacitors using such a gel electrolyte. The gel electrolyte includes a gel composition containing an electrolyte salt, a solvent for the electrolyte salt, and a polymer matrix, wherein the polymer matrix comprises a crosslinked polymer prepared by polymerizing a bifunctional (meth)acrylate represented by the following formula (I):

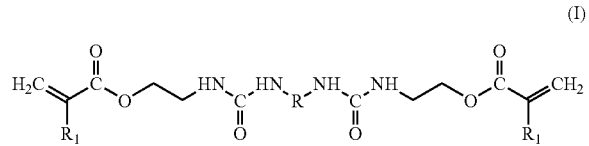

wherein R represents a divalent organic group, and $R_1$ represents a hydrogen atom or a methyl group.

3 Claims, 1 Drawing Sheet

FIGURE
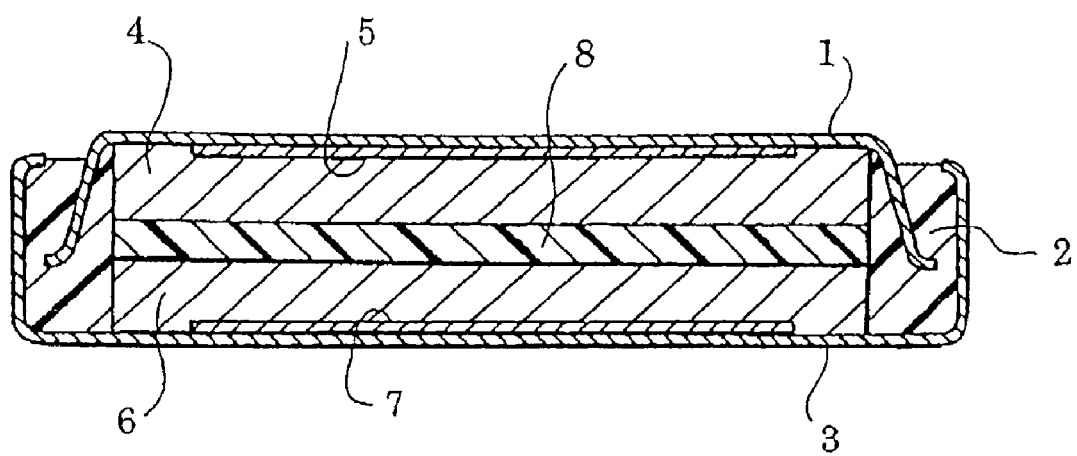

GEL ELECTROLYTE, PROCESS FOR PRODUCING THE SAME, AND USE THEREOF

FIELD OF THE INVENTION

The present invention relates to a gel electrolyte, and particularly, to a gel electrolyte that can be suitably used in, for example, batteries or capacitors.

DESCRIPTION OF THE RELATED ART

A solid electrolyte as referred to herein means a substance that is in a solid state and has a high ionic conductivity. Especially, in recent years, polymer solid electrolytes in which a polymer substance is used as a solid are watched as an electrolyte for next-generation lithium secondary batteries, and their researches are worldwide promoted.

As compared with the conventional electrolytic solutions, such polymer solid electrolytes are free from a fear of liquid leakage and have a large degree of freedom of the shape such that they can be processed into a thin film. However, the conventional polymer solid electrolytes involve a problem such that the conductivity is extremely low as compared with liquid electrolytes, i.e., electrolytic solutions. For example, there have hitherto been known non-aqueous polymer solid electrolytes comprising a composite of a chain polymer (such as polyethylene glycol and polypropylene glycol) or a comb-like polymer (such as polyphosphazene) and an electrolyte salt. However, there has hitherto been not found any solid electrolyte having a conductivity exceeding $10^{-3}$ S/cm at room temperature.

Then, in recent years, various non-aqueous gel electrolytes are researched for making them for practical use. According to these researches, there are proposed ones having a conductivity of $10^{-3}$ S/cm or more at room temperature and close to electrolytic solutions. Such gel-like electrolytes comprise an electrolyte salt dissolved in a gel formed from a polymer material and a non-aqueous organic solvent and can be, for example, obtained by holding an electrolytic solution in a polymer matrix.

Examples of these gel electrolytes are conventional gel electrolytes comprising an electrolytic solution carried in pores of a porous fluorocarbon polymer made of polyvinylidene fluoride or a vinylidene fluoride/hexafluoroporpylene copolymer as disclosed in, for example, JP-T-8-509100 and JP-T-9-500485 (the term "JP-T" as used herein means a published Japanese translation of a PCT patent application).

However, in these gel electrolytes, it is impossible to make the amount of the electrolytic solution carried in the porous fluorocarbon polymer so high. Accordingly, for example, in the case where such a gel electrolyte is used for a battery, sufficient battery characteristics cannot be obtained. In addition, since the electrolytic solution is carried in a liquid state in the pores of the porous polymer, there is a possibility that it causes liquid leakage.

On the other hand, JP-A-8-298126 proposes gel electrolytes comprising polyethylene oxide or a polyether polymer analogous thereto as a polymer matrix and also proposes gel electrolytes comprising a polyether polymer (such as polyethylene oxide and polypropylene oxide) as a polymer matrix and γ-butyrolactone as an organic solvent. Further, JP-A-11-176452 proposes gel electrolytes using a tetrafunctional terminal acryloyl-modified alkylene oxide polymer.

These polyether-based polymers give gel electrolytes that have a high compatibility with electrolytic solutions, are homogeneous and have a high conductivity. However, in the case where lithium hexafluorophosphate as generally used in lithium-ion batteries is used as an electrolyte salt, the polymers cause decomposition, resulting in a problem in durability.

SUMMARY OF THE INVENTION

The invention has been made to overcome the above-described problems of the conventional gel electrolytes.

Accordingly, an object of the invention is to provide a uniform gel electrolyte having high durability and its use, and particularly, to provide batteries or capacitors using such a gel electrolyte.

According to the invention, there is provided a gel electrolyte comprising a gel composition comprising an electrolyte salt, a solvent for the electrolyte salt, and a polymer matrix, wherein the polymer matrix comprises a crosslinked polymer prepared by polymerizing a bifunctional (meth)acrylate represented by the following formula (I):

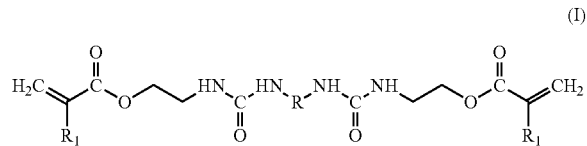

wherein R represents a divalent organic group, and $R_1$ represents a hydrogen atom or a methyl group.

Further, according to the invention, there is provided a process for producing a gel electrolyte, which comprises heating or irradiating with actinic radiations a solution containing an electrolyte salt, a solvent for the electrolyte salt, and a bifunctional (meth)acrylate represented by the following formula (I):

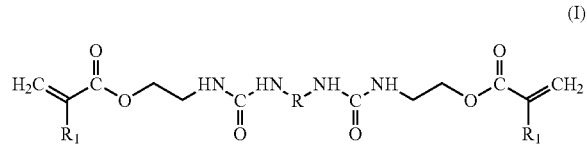

wherein R represents a divalent organic group, and $R_1$ represents a hydrogen atom or a methyl group, to polymerize the bifunctional (meth)acrylate, thereby forming a crosslinked polymer and forming a gel in which the electrolyte salt and the solvent are held in a matrix comprising the crosslinked polymer.

BRIEF DESCRIPTION OF THE DRAWING

The FIGURE is a cross-sectional view of a coin-type secondary battery using a gel electrolyte according to the invention.

DESCRIPTION OF THE PREFERRED EMBODIMENTS

In the gel electrolyte according to the invention, the polymer matrix comprises a crosslinked polymer prepared by polymerizing the bifunctional (meth)acrylate represented by the above-described formula (I).

In the invention, the term "(meth)acrylate" means an acrylate or a methacrylate, and the term "(meth)acryloyl" means an acryloyl or a methacryloyl.

The bifunctional (meth)acrylate can be obtained by reacting a diamine represented by the following formula (IV):

wherein R represents a divalent organic group, with 2-(meth)acryloyloxyethyl isocyanate in a reaction solvent. Accordingly, in the bifunctional (meth)acrylate, the divalent organic group represented by R is a residue of the diamine used as the starting material for the production (that is, a group in which two amino groups of the diamine have been eliminated).

Thus, according to the invention, although the divalent organic group or diamine residue is not particularly limited, preferred examples include:

(a) an alkylene group, (b) a divalent group represented by the following formula (II):

wherein $R_2$ represents an alkyl group, and $R_3$ and $R_4$ each independently represents an alkylene group, (c) a xylylene group, and (d) a divalent group represented by the following formula (III):

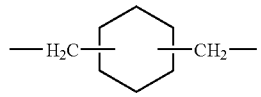

Of these organic groups, the alkylene group (a) is preferably a linear or branched alkylene group having 2 to 40 carbon atoms, such as an ethylene group, a propylene group, a hexamethylene group, and a dodecamethylene group. In the divalent group represented by the formula (II), the alkyl group represented by $R_2$ preferably has 1 to 10 carbon atoms; and the alkylene group represented by $R_3$ and $R_4$ preferably has 1 to 10 carbon atoms. Accordingly, a preferred example of the divalent group represented by the formula (II) is one in which $R_1$ represents a methyl group, and $R_2$ and $R_3$ each represents a trimethylene group.

Examples of the xylylene group include an o-xylylene group, an m-xylylene group and a p-xylylene group, and an m-xylylene group is particularly preferred. Examples of the divalent group represented by the formula (III) include:

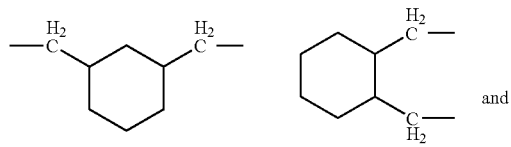

and

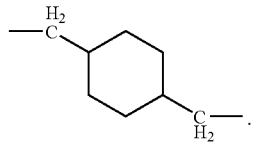

Of those, a diamine residue derived from 1,3-bis(aminomethyl)cyclohexane is preferable.

The gel electrolyte according to the invention can be obtained by, for example, dissolving the bifunctional (meth) acrylate in an electrolytic solution comprising an electrolyte salt and a solvent for the electrolyte salt preferably together with a polymerization initiator, and heating the resulting solution, thereby polymerizing (heat polymerizing) the bifunctional (meth)acrylate and forming a crosslinked polymer as the polymer matrix. In other words, according to the invention, the bifunctional (meth)acrylate is used as a gelling agent.

The polymerization initiator for polymerizing the bifunctional (meth)acrylate is not particularly limited, but examples thereof include benzoyl peroxide and 2,2'-azobisisobutyronitrile. However, the polymerization method of the bifunctional (meth)acrylate is not limited to the heat polymerization, but the bifunctional (meth)acrylate may be photo-polymerized upon irradiation with actinic radiations such as ultraviolet ray and electron beams.

In the gel electrolyte according to the invention, a proportion of the crosslinked polymer prepared by polymerizing the bifunctional (meth)acrylate is appropriately determined depending on the electrolyte salt and solvent used such that they form the gel electrolyte comprising the crosslinked polymer as the matrix. However, the proportion of the crosslinked polymer is usually in the range of from 0.1 to 50% by weight of the gel electrolyte. Especially, in the case where the gel electrolyte according to the invention is used as a gel electrolyte for batteries or capacitors, when the proportion of the polymer matrix in the gel electrolyte is large, the electric characteristics are lowered. Accordingly, the proportion of the crosslinked polymer is preferably in the range of from 0.1 to 25% by weight, and more preferably from 0.1 to 10% by weight, of the gel electrolyte.

Further, a proportion of the electrolyte salt in the gel electrolyte according to the invention is appropriately determined depending on not only the electrolyte salt itself but also the solvent used. The proportion of the electrolyte salt is usually in the range of from 1 to 50% by weight in the obtained gel electrolyte.

The electrolyte salt that can be used in the invention is salts comprising hydrogen, an alkali metal (such as lithium, sodium, and potassium), an alkaline earth metal (such as calcium and strontium), or a tertiary or quaternary ammonium salt as a cationic component and an inorganic acid (such as hydrochloric acid, nitric acid, phosphoric acid, sulfuric acid, fluoroboric acid, hydrofluoric acid, hexafluorophosphoric acid, and perchloric acid) or an organic acid (such as organic carboxylic acids, organic sulfonic acids, and fluorine-substituted organic sulfonic acids) as an anionic component. Especially, electrolyte salts comprising an alkali metal ion as a cationic component are preferably used.

Specific examples of the electrolyte salts comprising such an alkali metal ion as a cationic component include alkali metal perchlorates such as lithium perchlorate, sodium perchlorate, and potassium perchlorate; alkali metal tetrafluoroborates such as lithium tetrafluoroborate, sodium tetrafluoroborate, and potassium tetrafluoroborate; alkali metal hexafluorophosphates such as lithium hexafluorophosphate and potassium hexafluorophosphate; alkali metal trifluoroacetates such as lithium trifluoroacetate; and alkali metal trifluoromethanesulfonates such as lithium trifluoromethanesulfonate.

In addition, any solvent can be used as the solvent for the electrolyte salt in the invention so far as it can dissolve the electrolyte salt therein. Examples of non-aqueous solvents include cyclic esters such as ethylene carbonate, propylene carbonate, butylene carbonate, and γ-butyrolactone; cyclic or chain ethers such as tetrahydrofuran and dimethoxyethane; and chain esters such as dimethyl carbonate, diethyl carbonate, and ethylmethyl carbonate. These solvents may be used alone or as mixtures of two or more thereof.

In the case where the gel electrolyte according to the invention is used for batteries or capacitors, in order to prevent a short circuit between electrodes, the gel electrolyte can be used as a film-like gel electrolyte by appropriately carrying the same on a sheet-like substrate. When such a substrate is used, it is preferred to use a porous film as the sheet-like substrate not so as to obstruct the movement of ions between the electrodes.

That is, according to the invention, in the substrate porous film, the solution containing the electrolyte salt, the solvent for the electrolyte salt, and the bifunctional (meth)methacrylate represented by the formula (I) is heated or irradiated with actinic radiations to polymerize the bifunctional (meth)acrylate, thereby forming the crosslinked polymer and forming the gel in which the electrolyte salt and solvent are held in the matrix comprising the crosslinked polymer. There can be thus obtained the film-like gel electrolyte.

For example, the film-like gel electrolyte can be suitably used for the production of batteries or capacitors. For example, as a first method, electrodes and a substrate porous film are laminated or wound to form an electrochemical element, which is then installed in a battery can also functioning as an electrode can of the battery. Next, the solution containing the electrolyte salt, the solvent for the electrolyte salt and the bifunctional (meth)acrylate, and preferably the polymerization initiator is poured into the battery can, and the substrate porous film is impregnated with the solution. Thereafter, the bifunctional (meth)acrylate is polymerized upon heating, thereby forming the crosslinked polymer and forming a homogeneous gel electrolyte comprising the crosslinked polymer as the polymer matrix. There can be thus obtained a battery containing the film-like gel electrolyte.

As a second method, the bifunctional (meth)acrylate is previously carried on the substrate porous film, and the resulting porous film and electrodes are laminated or wound to form an electrochemical element, which is then installed in a battery can also functioning as an electrode can of the battery. Next, an electrolytic solution comprising the electrolyte salt and the solvent for the electrolyte salt, and preferably the polymerization initiator is poured into the battery can, and the substrate porous film is impregnated with the electrolytic solution to dissolve the bifunctional (meth)acrylate carried on the substrate porous film in the electrolytic solution. Thereafter, the bifunctional (meth) acrylate is polymerized upon heating, thereby forming the crosslinked polymer and forming a uniform gel electrolyte comprising the crosslinked polymer as the polymer matrix. There can be thus obtained a battery containing the film-like gel electrolyte.

As a third method, the bifunctional (meth)acrylate and the polymerization initiator are previously carried on the substrate porous film, and the resulting porous film and electrodes are laminated or wound to form an electrochemical element, which is then installed in a battery can also functioning as an electrode can of the battery. Next, an electrolytic solution comprising the electrolyte salt and the solvent for the electrolyte salt is poured into the battery can, and the substrate porous film is impregnated with the electrolytic solution to dissolve the bifunctional (meth) acrylate and the polymerization initiator carried on the substrate porous film in the electrolytic solution. Thereafter, the bifunctional (meth)acrylate is polymerized upon heating, thereby forming the crosslinked polymer and forming a homogeneous gel electrolyte comprising the crosslinked polymer as the polymer matrix. There can be thus obtained a battery containing the film-like gel electrolyte.

In addition, as another method, the bifunctional (meth) acrylate and the polymerization initiator are previously dissolved in an electrolytic solution comprising the electrolyte salt and the solvent for the electrolyte salt to prepare a solution. After impregnating the substrate porous film with the solution and impregnating electrodes (positive electrode and negative electrode) with the electrolytic solution, the resulting substrate porous film and electrodes are installed in a battery can, and a laminate comprising, for example, negative electrode/substrate porous film/positive electrode is formed within the battery can, to prepare an intermediate of a battery. Thereafter, the intermediate is heated to polymerize the bifunctional (meth)acrylate contained in the substrate porous film, thereby forming the crosslinked polymer and forming a uniform gel electrolyte comprising the crosslinked polymer as the polymer matrix. There can be thus obtained a battery containing the film-like gel electrolyte. It will be easily understood that capacitors can be obtained similarly by the above-described methods.

The FIGURE is a cross-sectional view of a coin-type lithium secondary battery using the gel electrolyte. In this lithium secondary battery, a positive electrode can 1 also functioning as a positive electrode terminal is made of, for example, a nickel-plated stainless steel sheet and is combined with a negative electrode can 3 also functioning as a negative electrode terminal, which is insulated from the positive electrode can 1 via an insulator 2, to configure a battery can (vessel). The negative electrode can 3 is also made of, for example, a nickel-plated stainless steel sheet.

Inside the thus formed battery can, a positive electrode 4 is arranged while contacting with the positive electrode can 1 via a positive electrode collector 5. For example, the positive electrode 4 can be obtained by mixing a positive electrode active material (such as a lithium-manganese composite oxide) and a conductive material (such as graphite) with a binder resin (such as polyethylene, polypropylene, and polytetrafluoroethylene) and pressure molding the mixture. Similarly, a negative electrode 6 is arranged while contacting with the negative electrode can 3 via a negative electrode collector 7. For example, the negative electrode 6 is made of a lithium sheet. A film-like gel electrolyte 8 according to the invention is arranged between the positive electrode 4 and the negative electrode 6 to configure a battery. According to the thus configured battery, an electric energy can be taken out while functioning the positive electrode can 1 and the negative electrode can 3 as terminals.

The invention will be described below in more detail with reference to the Examples together with the Referential Examples and Comparative Examples, but it should not be construed that the invention is limited thereto.

REFERENCE EXAMPLE 1

25.2 g of ethylenediamine was dissolved in 700 ml of toluene, and the resulting solution was heated to remove moisture as an azeotrope with toluene. The resulting solution was cooled to room temperature, and 4.8 g of 2-methacryloyloxyethyl isocyanate was then added dropwise to the solution over 10 minutes with stirring. The resulting mixture was reacted at room temperature for an additional 2 hours with stirring. A precipitated reaction product was collected by filtration and crystallized with a mixed solvent of methanol and toluene to obtain a bifunctional methacrylate represented by the following formula (1).

Molecular weight by mass analysis (ESI method): $(M+H)^+=371$

Proton NMR spectrum (400 MHz, solvent: deutero acetic acid, δ (ppm)):

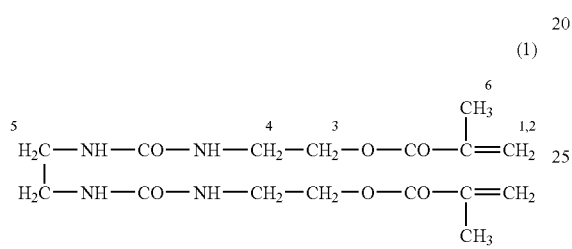

(1)

TABLE 1

| Assignment | δ (ppm) | Signal | Number of protons |
|---|---|---|---|
| 1 | 6.00 | m | 2 |
| 2 | 5.48 | m | 2 |
| 3 | 4.08 | t | 4 |
| 4 | 3.34 | t | 4 |
| 5 | 3.15 | s | 4 |
| 6 | 1.79 | m | 6 |

$^{13}$C-NMR spectrum (100 MHz, solvent: deutero acetic acid, δ (ppm)):

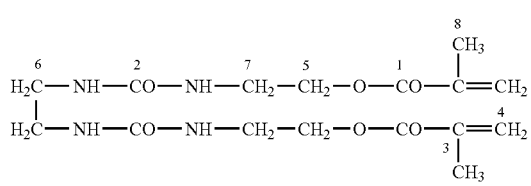

(1)

TABLE 2

| Assignment | δ (ppm) | Signal | Number of carbon atoms |
|---|---|---|---|
| 1 | 169.4 | s | 2 |
| 2 | 162.0 | s | 2 |
| 3 | 138.0 | s | 2 |
| 4 | 127.4 | t | 2 |
| 5 | 65.6 | t | 2 |
| 6 | 41.9 | t | 2 |
| 7 | 40.6 | t | 2 |
| 8 | 19.1 | q | 2 |

REFERENCE EXAMPLE 2

30.3 g of hexamethylenediamine was dissolved in 1 liter of toluene, and the resulting solution was heated to remove moisture as an azeotrope with toluene. The resulting solution was cooled to room temperature, and 84.9 g of 2-methacryloyloxyethyl isocyanate was then added dropwise to the solution over 10 minutes with stirring. Thereafter, the mixture was reacted at room temperature for an additional 2 hours with stirring. A precipitated reaction product was collected by filtration and crystallized with a mixed solvent of methanol and toluene to obtain a bifunctional methacrylate represented by the following formula (2).

Molecular weight by mass analysis (ESI method): $(M+H)^+=427$

Proton NMR spectrum (400 MHz, solvent: deutero acetic acid, δ (ppm)):

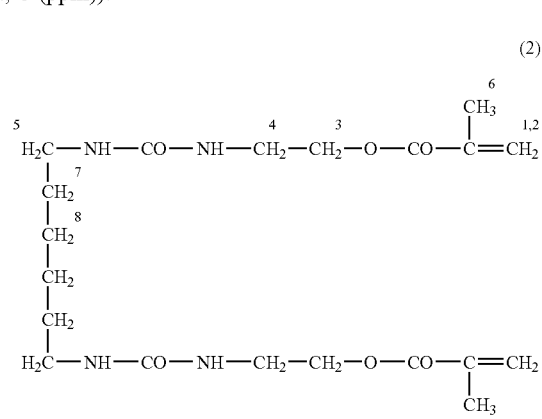

(2)

TABLE 3

| Assignment | δ (ppm) | Signal | Number of protons |
|---|---|---|---|
| 1 | 6.00 | m | 2 |
| 2 | 5.49 | m | 2 |
| 3 | 4.09 | t | 4 |
| 4 | 3.36 | t | 4 |
| 5 | 3.00 | t | 4 |
| 6 | 1.79 | s | 6 |
| 7 | 1.36 | m | 4 |
| 8 | 1.19 | m | 4 |

$^{13}$C-NMR spectrum (100 MHz, solvent: deutero acetic acid, δ (ppm)):

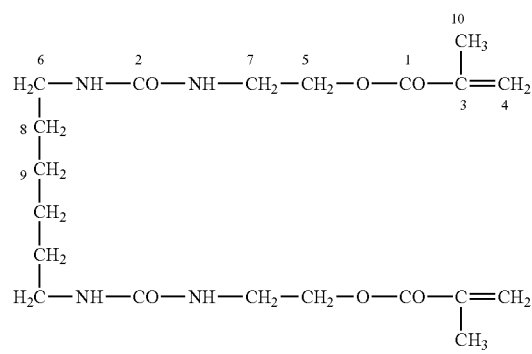

(2)

TABLE 4

| Assignment | δ (ppm) | Signal | Number of carbon atoms |
|---|---|---|---|
| 1 | 169.6 | s | 2 |
| 2 | 161.8 | s | 2 |
| 3 | 138.0 | s | 2 |
| 4 | 127.4 | t | 2 |
| 5 | 65.7 | t | 2 |
| 6 | 41.9 | t | 2 |
| 7 | 40.9 | t | 2 |
| 8 | 31.2 | t | 2 |
| 9 | 27.9 | t | 2 |
| 10 | 19.0 | q | 2 |

REFERENCE EXAMPLE 3

34.3 g of methyliminobis(propylamine) was dissolved in 200 ml of toluene, and the resulting solution was heated to remove moisture as an azeotrope with toluene. The resulting solution was cooled to room temperature, and 15.7 g of 2-methacryloyloxyethyl isocyanate was then added dropwise to the solution over 10 minutes with stirring. Thereafter, the resulting mixture was reacted at room temperature for an additional 2 hours with stirring. A precipitated reaction product was collected by filtration and crystallized with a mixed solvent of methanol and toluene to obtain a bifunctional methacrylate represented by the following formula (3).

Molecular weight by mass analysis (ESI method): $(M+H)^+=456$

Pronton NMR spectrum (400 MHz, solvent: deutero acetic acid, δ (ppm)):

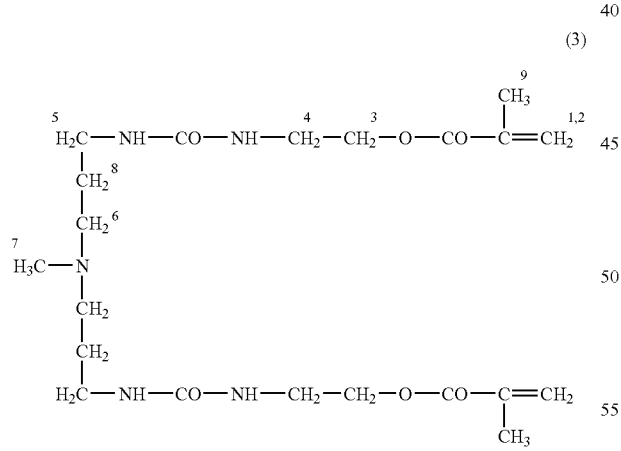

(3)

TABLE 5

| Assignment | δ (ppm) | Signal | Number of protons |
|---|---|---|---|
| 1 | 6.00 | m | 2 |
| 2 | 5.49 | m | 2 |
| 3 | 4.09 | t | 4 |
| 4 | 3.34 | t | 4 |
| 5 | 3.16 | t | 4 |
| 6 | 3.02 | m | 4 |
| 7 | 2.74 | s | 3 |
| 8 | 1.85 | m | 4 |
| 9 | 1.81 | s | 6 |

$^{13}$C-NMR spectrum (100 MHz, solvent: deutero acetic acid, δ (ppm)):

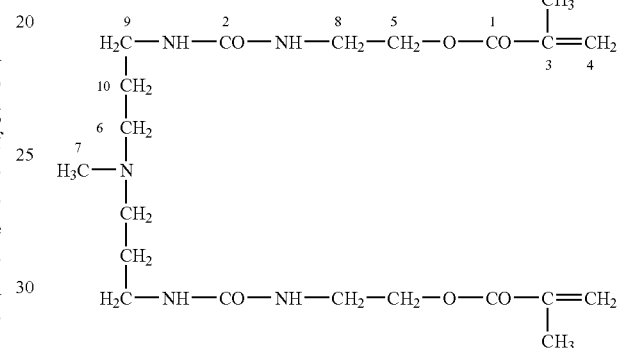

(3)

TABLE 6

| Assignment | δ (ppm) | Signal | Number of carbon atoms |
|---|---|---|---|
| 1 | 169.3 | s | 2 |
| 2 | 161.9 | s | 2 |
| 3 | 137.9 | s | 2 |
| 4 | 127.3 | t | 2 |
| 5 | 65.4 | t | 2 |
| 6 | 55.2 | t | 2 |
| 7 | 40.9 | q | 1 |
| 8 | 40.8 | t | 2 |
| 9 | 38.2 | t | 2 |
| 10 | 26.4 | t | 2 |
| 11 | 19.0 | q | 2 |

REFERENCE EXAMPLE 4

17.1 g of m-xylylenediamine was dissolved in 1 liter of toluene, and the resulting solution was heated to remove moisture as an azeotrope with toluene. The resulting solution was cooled to room temperature, and 40.8 g of 2-methacryloyloxyethyl isocyanate was then added dropwise to the solution over 10 minutes with stirring. Thereafter, the mixture was reacted at room temperature for an additional 3 hours with stirring. A precipitated reaction product was collected by filtration and crystallized with a mixed solvent of methanol and toluene to obtain a bifunctional methacrylate represented by the following formula (4).

Molecular weight by mass analysis (ESI method): $(M+H)^+=447$

Proton NMR spectrum (400 MHz, solvent: deutero acetic acid, δ (ppm)):

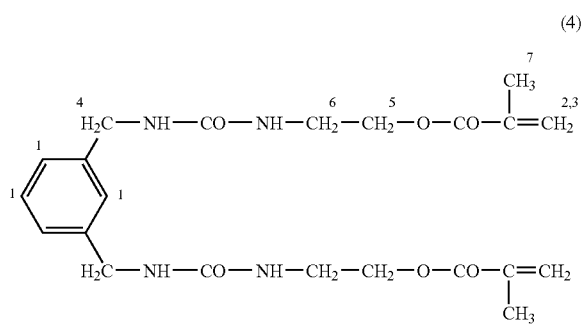

(4)

TABLE 7

| Assignment | δ (ppm) | Signal | Number of protons |
|---|---|---|---|
| 1 | 7.14 to 7.03 | m | 4 |
| 2 | 5.97 | m | 2 |
| 3 | 5.47 | m | 2 |
| 4 | 4.22 | s | 4 |
| 5 | 4.09 | t | 4 |
| 6 | 3.38 | t | 4 |
| 7 | 1.77 | s | 6 |

$^{13}$C-NMR spectrum (100 MHz, solvent: deutero acetic acid, δ (ppm)):

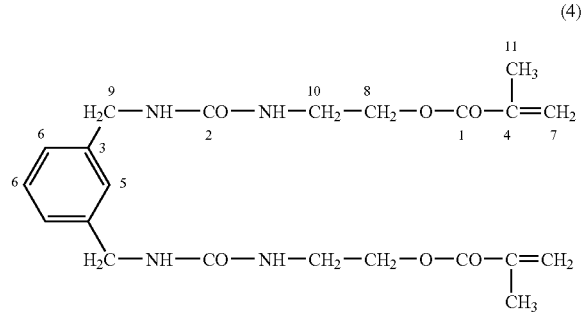

(4)

TABLE 8

| Assignment | δ (ppm) | Signal | Number of carbon atoms |
|---|---|---|---|
| 1 | 169.6 | s | 2 |
| 2 | 161.7 | s | 2 |
| 3 | 141.2 | s | 2 |
| 4 | 138.0 | s | 2 |
| 5 | 130.4 | d | 1 |
| 6 | 127.8 | d | 3 |
| 7 | 127.5 | t | 2 |
| 8 | 65.8 | t | 2 |
| 9 | 45.5 | t | 2 |
| 10 | 40.9 | t | 2 |
| 11 | 19.1 | q | 2 |

REFERENCE EXAMPLE 5

9.0 g of 1,3-bis(aminomethyl)cyclohexane was dissolved in 1 liter of toluene, and the resulting solution was heated to remove moisture as an azeotrope with toluene. The resulting solution was cooled to room temperature, and 25.8 g of 2-methacryloyloxyethyl isocyanate was then added dropwise to the solution over 30 minutes with stirring. Thereafter, the mixture was reacted at room temperature for an additional 3 hours with stirring. A precipitated reaction product was collected by filtration and crystallized with a mixed solvent of methanol and toluene to obtain a bifunctional methacrylate represented by the following formula (5).

Molecular weight by mass analysis (ESI method): $(M+H)^+ = 453$

Proton NMR spectrum (400 MHz, solvent: deutero acetic acid, δ (ppm)):

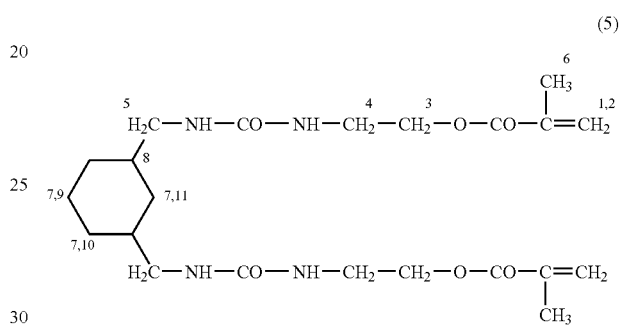

(5)

TABLE 9

| Assignment | δ (ppm) | Signal | Number of protons |
|---|---|---|---|
| 1 | 6.00 | m | 2 |
| 2 | 5.49 | m | 2 |
| 3 | 4.09 | t | 4 |
| 4 | 3.35 | t | 4 |
| 5 | 2.87 | m | 4 |
| 6 | 1.79 | s | 6 |
| 7 | 1.61 | m | 4 |
| 8 | 1.32 | m | 2 |
| 9 | 1.12 | m | 1 |
| 10 | 0.69 | m | 2 |
| 11 | 0.43 | m | 1 |

$^{13}$C-NMR spectrum (100 MHz, solvent: deutero acetic acid, δ (ppm)):

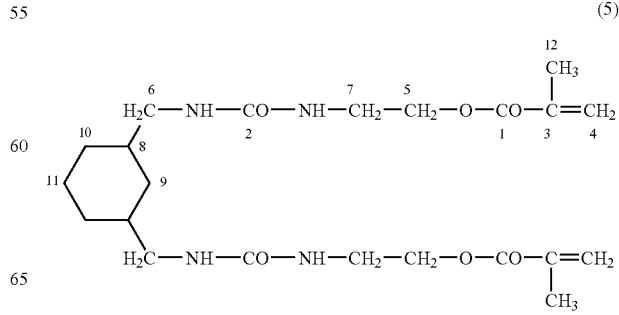

(5)

TABLE 10

| Assignment | δ (ppm) | Signal | Number of carbon atoms |
|---|---|---|---|
| 1 | 169.5 | s | 2 |
| 2 | 161.9 | s | 2 |
| 3 | 137.9 | s | 2 |
| 4 | 127.5 | t | 2 |
| 5 | 65.7 | t | 2 |
| 6 | 48.2 | t | 2 |
| 7 | 40.8 | t | 2 |
| 8 | 39.6 | d | 2 |
| 9 | 36.3 | t | 1 |
| 10 | 32.0 | t | 2 |
| 11 | 26.9 | t | 1 |
| 12 | 19.1 | q | 2 |

REFERENCE EXAMPLE 6

10.5 g of 1,12-dodecanediamine was dissolved in 500 ml of toluene, and the resulting solution was heated to remove moisture as an azeotrope with toluene. The resulting solution was cooled to room temperature, and 17.1 g of 2-methacryloyloxyethyl isocyanate was then added dropwise to the solution over 10 minutes with stirring. Thereafter, the mixture was reacted at room temperature for an additional 3 hours with stirring. A precipitated reaction product was collected by filtration and crystallized with a mixed solvent of methanol and toluene to obtain a bifunctional methacrylate represented by the following formula (6).

Molecular weight by mass analysis (ESI method): $(M+H)^+ = 511$

Proton NMR spectrum (400 MHz, solvent: deutero dimethyl sulfoxide, δ (ppm)):

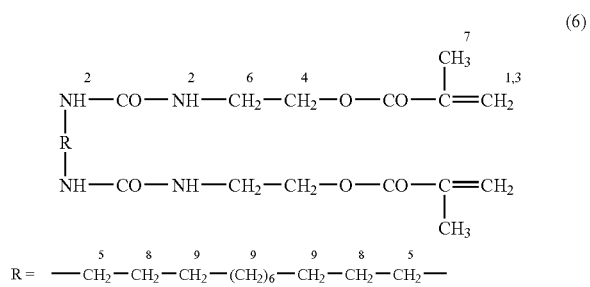

TABLE 11

| Assignment | δ (ppm) | Signal | Number of protons |
|---|---|---|---|
| 1 | 6.05 | s | 2 |
| 2 | 5.80 | m | 4 |
| 3 | 5.65 | m | 2 |
| 4 | 4.07 | m | 4 |
| 5 | 3.28 | q | 4 |
| 6 | 2.97 | q | 4 |
| 7 | 1.90 | s | 6 |
| 8 | 1.36 | m | 4 |
| 9 | 1.25 | m | 16 |

$^{13}$C-NMR spectrum (100 MHz, solvent: deutero dimethyl sulfoxide, δ (ppm)):

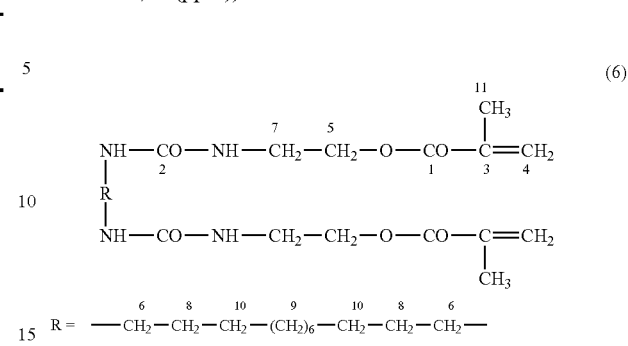

TABLE 12

| Assignment | δ (ppm) | Signal | Number of carbon atoms |
|---|---|---|---|
| 1 | 166.5 | s | 2 |
| 2 | 158.3 | s | 2 |
| 3 | 136.0 | s | 2 |
| 4 | 125.3 | t | 2 |
| 5 | 64.1 | t | 2 |
| 6 | 39.2 | t | 2 |
| 7 | 38.4 | t | 2 |
| 8 | 29.9 | t | 2 |
| 9 | 28.9 to 28.7 | t | 6 |
| 10 | 26.3 | t | 2 |
| 11 | 17.8 | q | 2 |

REFERENCE EXAMPLE 7

14.9 g of 1,2-propanediamine was dissolved in 500 ml of toluene, and the resulting solution was heated to remove moisture as an azeotrope with toluene. The resulting solution was cooled to room temperature, and 65.4 g of 2-methacryloyloxyethyl isocyanate was then added dropwise to the solution over 10 minutes with stirring. Thereafter, the mixture was reacted at room temperature for an additional 3 hours with stirring. A precipitated reaction product was collected by filtration and crystallized with a mixed solvent of methanol and toluene to obtain a bifunctional methacrylate represented by the following formula (7).

Molecular weight by mass analysis (ESI method): $(M+H)^+ = 385$

Proton NMR spectrum (400 MHz, solvent: deutero dimethyl sulfoxide, δ (ppm)):

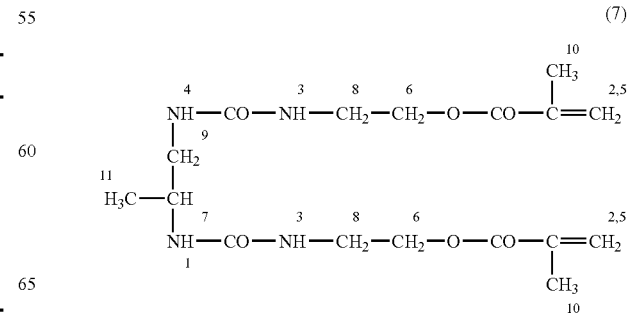

TABLE 13

| Assignment | δ (ppm) | Signal | Number of protons |
|---|---|---|---|
| 1 | 6.12 | m | 1 |
| 2 | 6.05 | s | 2 |
| 3 | 6.00 | m | 2 |
| 4 | 5.85 | d | 1 |
| 5 | 5.67 | s | 2 |
| 6 | 4.05 | t | 4 |
| 7 | 3.55 | m | 1 |
| 8 | 3.30 to 3.22 | m | 4 |
| 9 | 2.96 | m | 2 |
| 10 | 1.88 | s | 6 |
| 11 | 0.96 | d | 3 |

$^{13}$C-NMR spectrum (100 MHz, solvent: deutero dimethyl sulfoxide, δ (ppm)):

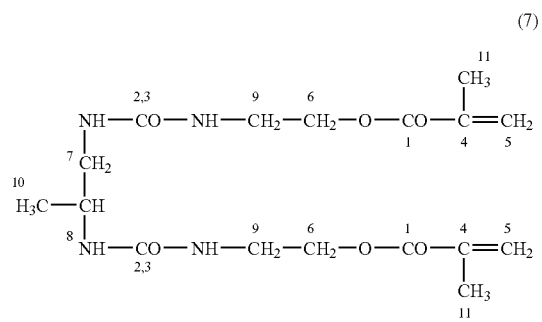

(7)

TABLE 14

| Assignment | δ (ppm) | Signal | Number of carbon atoms |
|---|---|---|---|
| 1 | 166.5 | s | 2 |
| 2 | 158.1 | s | 1 |
| 3 | 157.6 | s | 1 |
| 4 | 135.8 | s | 2 |
| 5 | 125.8 | t | 2 |
| 6 | 64.1 | t | 2 |
| 7 | 45.9 | t | 1 |
| 8 | 45.1 | d | 1 |
| 9 | 38.2 | t | 2 |
| 10 | 18.9 | q | 1 |
| 11 | 18.0 | q | 2 |

EXAMPLE 1

In an argon-purged glove box, lithium hexafluorophosphate (LiPF$_6$) as an electrolyte salt was dissolved in an ethylene carbonate/ethylmethyl carbonate mixed solvent (volume ratio: 1/2) such that the concentration of the electrolyte salt became 1.2 moles/l, to prepare an electrolytic solution. 3.0 g of the bifunctional methacrylate as prepared in Referential Example 1 was added to 97.0 g of this electrolytic solution, and the resulting mixture was stirred for dissolution at room temperature. 0.06 g of benzoyl peroxide was further added to the mixture, which was then stirred for dissolution at room temperature. There was thus prepared a solution A.

Gelation Test and Heat Resistance Test of Gel

For the tests, in an argon-purged glove box, the solution A was charged in a glass bottle, and the glass bottle was sealed and then placed in a thermostatic chamber at 80° C. for 1 hour to polymerize the bifunctional methacrylate, thereby forming a crosslinked polymer. There was thus obtained a self-supporting gel electrolyte. This gel electrolyte was allowed to stand in a sealed state within the thermostatic chamber at 80° C. for 5 days. As a result, no separation of any liquid material was observed, and the resulting electrolyte maintained the gel state.

Preparation of Battery and Discharge Load Characteristic of Electrolyte

Each of a polyethylene resin-made porous film (thickness: 25 μm, porosity: 50%, mean pore size: 0.1 μm), a positive electrode made of lithium cobaltate (LiCoO$_2$) as an active material, and a negative electrode made of natural graphite as an active material was impregnated with the solution A. The resulting negative electrode, polyethylene resin-made porous film and positive electrode were charged into a battery can (battery can for coin battery of 2016 size) also functioning as a pair of electrode cans in that order, to form a laminate comprising negative electrode/polyethylene resin-made porous film/positive electrode within the can. There was thus prepared an intermediate of a coin battery. Subsequently, the intermediate was placed in a thermostatic chamber at 80° C. for 1 hour to polymerize the bifunctional methacrylate, thereby forming a crosslinked polymer and forming a gel electrolyte. There was thus prepared a coin-type lithium-ion secondary battery.

This battery was subjected to charge and discharge five times at a rate of 0.2 CmA. Thereafter, the battery was charged at a rate of 0.2 CmA and then discharged at a rate of 2.0 CmA. Thus, the charge load characteristic of the electrolyte was evaluated in a discharge capacity ratio of 2.0 CmA/0.2 CmA. As a result, it was found to be 91%.

EXAMPLE 2

A solution B was prepared in the same manner as in the preparation of the solution A of Example 1, except that the bifunctional methacrylate as prepared in Reference Example 2 was used in place of the bifunctional methacrylate as prepared in Reference Example 1.

Gelation Test and Heat Resistance Test of Gel

Using the solution B, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Electrolyte

Using the solution B, a coin-type battery was prepared in the same manner as in Example 1. The discharge load characteristic of the electrolyte was evaluated under the same conditions as in Example 1. As a result, it was found to be 90%.

EXAMPLE 3

A solution C was prepared in the same manner as in the preparation of the solution A of Example 1, except that the bifunctional methacrylate as prepared in Reference Example 3 was used in place of the bifunctional methacrylate as prepared in Reference Example 1.

Gelation Test and Heat Resistance Test of Gel

Using the solution C, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Electrolyte

Using the solution C, a coin-type battery was prepared in the same manner as in Example 1. The discharge load characteristic of the electrolyte was evaluated under the same conditions as in Example 1. As a result, it was found to be 89%.

EXAMPLE 4

A solution D was prepared in the same manner as in the preparation of the solution A of Example 1, except that the bifunctional methacrylate as prepared in Reference Example 4 was used in place of the bifunctional methacrylate as prepared in Reference Example 1.

Gelation Test and Heat Resistance Test of Gel

Using the solution D, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Electrolyte

Using the solution D, a coin-type battery was prepared in the same manner as in Example 1. The discharge load characteristic of the electrolyte was evaluated under the same conditions as in Example 1. As a result, it was found to be 92%.

EXAMPLE 5

A solution E was prepared in the same manner as in the preparation of the solution A of Example 1, except that the bifunctional methacrylate as prepared in Reference Example 5 was used in place of the bifunctional methacrylate as prepared in Reference Example 1.

Gelation Test and Heat Resistance Test of Gel

Using the solution E, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Eectrolyte

Using the solution E, a coin-type battery was prepared in the same manner as in Example 1. The discharge load characteristic of the electrolyte was evaluated under the same conditions as in Example 1. As a result, it was found to be 88%.

EXAMPLE 6

A solution F was prepared in the same manner as in the preparation of the solution A of Example 1, except that the bifunctional methacrylate as prepared in Reference Example 6 was used in place of the bifunctional methacrylate as prepared in Reference Example 1.

Gelation Test and Heat Resistance Test of Gel

Using the solution F, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Electrolyte

Using the solution F, a coin-type battery was prepared in the same manner as in Example 1. The discharge load characteristic of the electrolyte was evaluated under the same conditions as in Example 1. As a result, it was found to be 93%.

EXAMPLE 7

A solution G was prepared in the same manner as in the preparation of the solution A of Example 1, except that the bifunctional methacrylate as prepared in Reference Example 7 was used in place of the bifunctional methacrylate as prepared in Reference Example 1.

Gelation Test and Heat Resistance Test of Gel

Using the solution G, a self-supporting gel electrolyte was obtained in the same manner as in Example 1. In the same heat resistance test of Example 1, this gel electrolyte was free from separation of any liquid material and kept the gel state.

Preparation of Battery and Discharge Load Characteristic of Electrolyte

Using the solution G, a coin-type battery was prepared in the same manner as in Example 1. The discharge load characteristic of the electrolyte was evaluated under the same conditions as in Example 1. As a result, it was found to be 90%.

COMPARATIVE EXAMPLE 1

In an argon-purged glove box, lithium hexafluorophosphate ($LiPF_6$) as an electrolyte salt was dissolved in an ethylene carbonate/ethylmethyl carbonate mixed solvent (volume ratio: 1/2) such that the concentration of the electrolyte salt became 1.2 moles/l, to prepare an electrolytic solution. 3.0 g of polyethylene glycol dimethacrylate (NK ESTER 9G, manufactured by Shin-Nakamura Chemical Co., Ltd.) was added to 97.0 g of this electrolytic solution, and the resulting mixture was stirred for dissolution at room temperature. 0.06 g of 2,2'-azobisisobutyronitrile was further added to the mixture. There was thus prepared a solution P.

Gelation Test and Heat Resistance Test of Gel

In an argon-purged glove box, the solution P was charged in a glass bottle, and the glass bottle was sealed and then placed in a thermostatic chamber at 80° C. for 1 hour to polymerize the polyethylene glycol dimethacrylate, thereby forming a polymer. However, the resulting electrolyte was a flowable liquid. This liquid electrolyte was allowed to stand in a sealed state within the thermostatic chamber at 80° C. for 5 days. As a result, it was discolored blackish brown, and a reduction of viscosity of the solution was observed.

Preparation of Battery and Discharge Load Characteristic of Electrolyte

Using the solution P, a coin-type battery was prepared in the same manner as in Example 1. The discharge load characteristic of the electrolyte was evaluated in a discharge capacity ratio of 2.0 CmA/0.2 CmA in the same manner as in Example 1. As a result, it was found to be 80%.

COMPARATIVE EXAMPLE 2

In an argon-purged glove box, $LiPF_6$ as an electrolyte salt was dissolved in an ethylene carbonate/ethylmethyl carbonate mixed solvent (volume ratio: 1/2) such that the concentration of the electrolyte salt became 1.2 moles/l, to prepare an electrolytic solution. 20.0 g of polyethylene glycol dimethacrylate (NK ESTER 9G, manufactured by Shin-Nakamura Chemical Co., Ltd.) was added to 80.0 g of this electrolytic solution, and the resulting mixture was stirred for dissolution at room temperature. 0.4 g of 2,2'-azobisisobutyronitrile was further added to the mixture. There was thus prepared a solution Q.

Gelation Test and Heat Resistance Test of Gel

In an argon-purged glove box, the solution Q was charged in a glass bottle, and the glass bottle was sealed and then placed in a thermostatic chamber at 80° C. for 1 hour to obtain a self-supporting gel electrolyte. This gel electrolyte was allowed to stand in a sealed state within the thermostatic chamber at 80° C. for 5 days. As a result, it was discolored blackish brown and changed to a flowable liquid.

Preparation of Battery and Discharge Load Characteristic of Electrolyte

Using the solution Q, a coin-type battery was prepared in the same manner as in Example 1. The discharge load characteristic of the electrolyte was evaluated under the same conditions as in Example 1. As a result, it was found to be 40%.

COMPARATIVE EXAMPLE 3

15 g of a vinylidene fluoride (VdF)/hexafluoropropylene (HFP) copolymer resin (KYNAR 2801, manufactured by Elf Atochem SA) and 30 g of dibutyl phthalate were added to 200 g of acetone, and the resulting mixture was mixed in a ball mill to prepare a homogeneous solution R. The solution R was cast in a uniform thickness on a tetrafluoroethylene resin sheet by a doctor blade, and the acetone was evaporated at 60° C. to form a film having a thickness of 40 μm. This film was dipped in diethyl ether, and the dibutyl phthalate was extracted to obtain a 40 μm-thick porous film made of a VdF/HFP copolymer resin.

In an argon-purged-glove box, $LiPF_6$ as an electrolyte salt was dissolved in an ethylene carbonate/ethylmethyl: carbonate mixed solvent (volume ratio: 1/2) such that the concentration of the electrolyte salt became 1.2 moles/l, to prepare an electrolytic solution.

In an argon-purged glove box, the porous film was dipped in this electrolytic solution for one hour, thereby holding the electrolytic solution on the porous film. There was thus prepared a gel electrolyte. Determining from an increase in weight before and after dipping the porous film in the electrolytic solution, a weight ratio of the copolymer resin to the electrolytic solution of the gel electrolyte was found to be 30/70.

Heat Resistance Test of Gel

In an argon-purged glove box, this gel electrolyte was charged in a glass bottle, and the glass bottle was sealed and allowed to stand in a sealed state within the thermostatic chamber at 80° C. for 5 days. As a result, separation of the electrolytic solution was observed.

Preparation of Battery and Discharge Load Characteristic of Electrolyte

Using the foregoing gel electrolyte, a coin-type battery was prepared in the same manner as in Example 1. The discharge load characteristic of the electrolyte was evaluated in a discharge capacity ratio of 2.0 CmA/0.2 CmA in the same manner as in Example 1. As a result, it was found to be 73%.

As described above, the gel electrolyte according to the invention comprises as a matrix a crosslinked polymer prepared by polymerizing a bifunctional (meth)acrylate represented by the foregoing general formula as a gelling agent and has superior electrolytic characteristics. Moreover, according to the invention, the use of a small quantity of the foregoing gelling agent enables one to obtain a homogeneous gel electrolyte having superior durability.

By using such a gel electrolyte, it is possible to obtain batteries or capacitors that are free from a fear of liquid leakage and have high performance and durability.

It should further be apparent to those skilled in the art that various changes in form and detail of the invention as shown and described above may be made. It is intended that such changes be included within the spirit and scope of the claims appended hereto.

This application is based on Japanese Patent Application No. 2002-86440 filed Mar. 26, 2002, the disclosure of which is incorporated herein by reference in its entirety.

What is claimed is:

1. A gel electrolyte comprising a gel composition comprising an electrolyte salt, a solvent for the electrolyte salt, and a polymer matrix, wherein the polymer matrix comprises a crosslinked polymer prepared by polymerizing a bifunctional (meth)acrylate represented by the following formula (I):

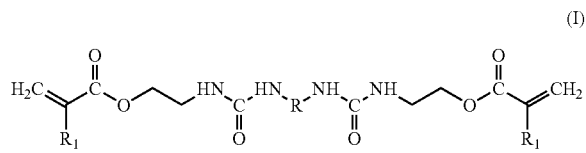

wherein R represents a divalent organic group selected from:
(a) an alkylene group,
(b) a divalent group represented by the following general formula (II):

wherein $R_2$ represents an alkyl group, and $R_3$ and $R_4$ each independently represents an alkylene group,
(c) a xylylene group, and
(d) a divalent group represented by the following general formula (III):

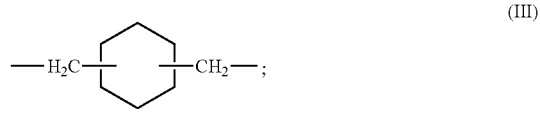

$R_1$ represents a hydrogen atom or a methyl group.

2. A film-like gel electrolyte comprising the gel electrolyte as claimed in claim 1 carried on a substrate porous film.

3. A non-aqueous electrolytic battery comprising the gel electrolyte as claimed in claim 1 as an electrolyte.

* * * * *